Aug. 12, 1969    E. VOGELI    3,460,710
COVER PLATE FOR A PRESSURE VESSEL
Filed July 12, 1968
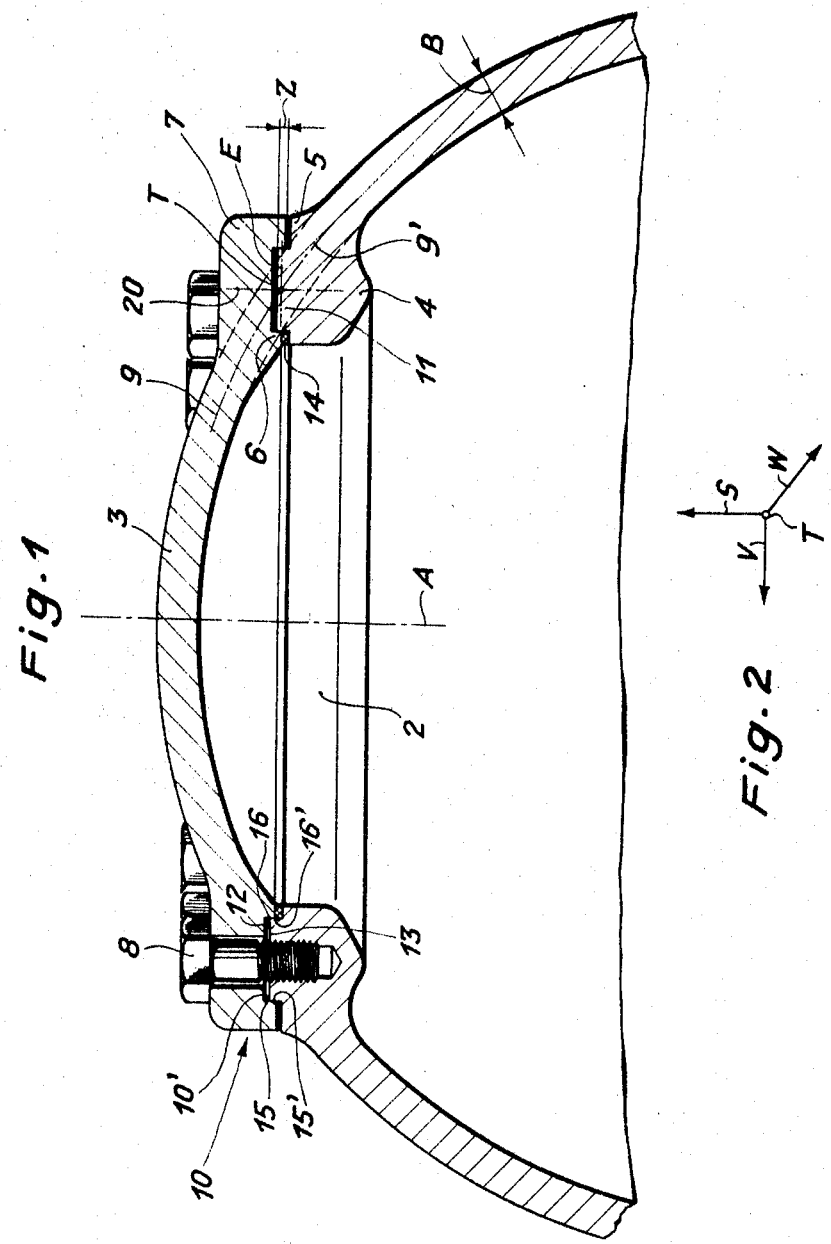
Inventor:
ERNST VOGELI
BY
ATTORNEYS

United States Patent Office 3,460,710
Patented Aug. 12, 1969

3,460,710
COVER PLATE FOR A PRESSURE VESSEL
Ernst Vögeli, Wiesendangen, Zurich, Switzerland, assignor to Sulzer Brothers, Ltd., Winterthur, Switzerland, a corporation of Switzerland
Filed July 12, 1968, Ser. No. 747,767
Claims priority, application Switzerland, July 27, 1967, 10,684/67
Int. Cl. B65d 45/00; A47j 27/08, 36/10
U.S. Cl. 220—55
5 Claims

ABSTRACT OF THE DISCLOSURE

The centerline of the cover plate wall is arranged in alignment with centerline of the pressure vessel wall while the axes of the mounting bolts intersect the plane bisecting the zone of mutual engagement between the mating annular groove and projection of the cover plate and pressure vessel, respectively. The curvature of the cover plate is the same as the pressure vessel while the built-up areas do not exceed eight times the square of the pressure vessel wall thickness.

---

This invention relates to a cover plate for a pressure vessel. More particularly, this invention relates to a cover plate for a rounded wall of a pressure vessel, and still more particularly, for a pressure vessel exposed to high pressures and temperature variation.

Previously, where cover plates were used on rounded portions of pressure vessels, thick flanges had to be provided on the vessels and cover plates in order to ensure an effective seal and to provide a satisfactory force transfer. However, in those instances where temperatures change rapidly, for example, in the valves of steam power plants such flanges have been unsuitable due to the heat stresses arising therein. Thus, where such thick flanges have been used the speed of temperature variations have required restrictions. In addition, because of the added outlay in flange material, these flanges have been relatively expensive.

Accordingly, it is an object of the invention to only slightly thicken the joint between a pressure vessel and a cover plate therefor.

It is another object of the invention to reduce the heat stress variations between a pressure vessel and cover plate therefor.

It is another object of the invention to provide a relatively inexpensive manner of mounting a cover plate on a pressure vessel.

Briefly, the invention provides a pressure vessel with a rounded wall portion with a cover plate of similar roundness wherein the stresses therebetween are held to a minimum. The rim of the pressure vessel about an opening therein is slightly thickened and provided with an outstanding annular projection. The rim of the cover plate is provided with an annular groove which fits over the projection of the pressure vessel rim so that an annular zone of mutual contact is formed between the pressure vessel and cover plate. In addition, a plurality of bolts are used to secure the cover plate to the pressure vessel about the opening in the pressure vessel. These bolts are disposed to pass through the mating groove and projection in planes which intersect with the centerline of the walls of the pressure vessel and cover plate. The points of intersection of the bolts and wall centerlines are also disposed in a plane which is perpendicular to the pressure vessel projection and which bisects the zone of mutual contact of the projection and groove.

The cover plate is secured in a fluid tight manner to the pressure vessel in alignment with the centerline axis of the pressure vessel so that the walls of the annular groove mating with the projection of the vessel react against the pressures radially expanding the cover plate.

The cover plate is used preferably with pressure vessels which are exposed to high pressures and considerable temperature variations.

These and other objects and advantages of the invention will become more apparent from the following detailed description and appended claims taken in conjunction with the accompanying drawings in which:

FIG. 1 illustrates a fragmentary cross-sectional view through a pressure vessel utilizing a cover plate according to the invention; and FIG. 2 illustrates a force diagram for the joint at the right hand side of FIG. 1.

Referring to FIG. 1, sperical wall portion 1 of a pressure vessel, for example, a housing of a large valve, defines an aperture 2 which is closed by a cover plate 3. The wall portion 1 which has a wall thickness B has thicker rim portions 4, 5 around the periphery of the aperture 2 which project beyond the course of the the wall thickness B. Likewise, the cover plate 3 which can also be of the same wall thickness B as the pressure vessel has thicker rim portions 6, 7 which project beyond the course of the wall thickness B. The cover plate 3 is secured to the pressure vessel portion 1 by a plurality of bolts 8 which pass through the thickened rim portion 4–7.

The sperical portion 1 is provided with an annular projection 11 while the cover plate 3 is provided with a mating groove 10' at the joint between the pressure vessel and cover plate to form a step 10. The groove 10' and projection 11 are formed by flat surfaces 12, 13 and cylindrical surfaces 15, 15', 16, 16' which have an axis A and are perpendicular to the flat surfaces 12, 13. The cylindrical surfaces are also adjoined to other flat surfaces which extend inwardly and outwardly of the groove 10' and projection 11. In addition, a packing 14 is disposed between the spherical portion 1 and cover plate 3 inwardly of the projection 11 to ensure a fluid-tight seal.

The centerline 9 of the wall of the cover plate 3 is disposed in alignment with the centerline 9' of the pressure vessel wall. Also, the axes 20 of the bolts 8 and the plane E which passes through the center of the overlapping portion Z of the cylindrical outer surfaces 15, 15' of the groove 10' and projection 11 intersect on the aligned centerlines 9, 9' at points T, as shown rotated in the plane of the drawing.

Referring to FIG. 2, when the pressure vessel is under internal pressure the force pattern at the point T includes a tractional force W which acts tangentially relative to the centerlines 9, 9'. This tractional force is counteracted in the step by a force V and the bolt force S. As shown, the forces cancel each other without giving rise to a bending moment. Thus, stressing of the material at the joint is favorable.

The invention thus provide a cover plate for a pressure vessel wherein the rim portions around the aperture of the pressure vessel and cover plate required only a slight thickening which is intended mainly to provide for the step and tap-holes for the bolts.

There is no substantial build-up of material which would lead to heat stressing in the event of fairly fast temperature variations. Since the reinforcement at the vessel and cover plate rims is only slight, the cover plate shares in the expansion of the vessel during operation. The discontinuity which the cover plate causes in the stress pattern is therefore small.

Obviously, slight deviations from the ideal, in which the forces, S, V and W intersect at a common intersection point T, are possible. It has been found that the intersection point of the bolt axis with the central plane of the step must not be more than one-quarter of the wall thickness away from the center of gravity line of the wall cross-sections, if stressing at the joint is not to become much less satisfactory.

Further, the wall of the cover plate preferably has the same curvature as the adjacent portion of the wall of the pressure vessel, for example, the same sphere radius in the case of FIG. 1. Also, the pressure vessel can be conical in shape.

It has also been found that, in order to obtain the advantages of the invention, viewed in section and averaged over the circumference, the material built-up beyond the normal course of the wall thickness at the joint between the cover plate and vessel must not in total exceed eight times the square of the pressure vessel wall thickness B.

What is claimed is:

1. In combination, a pressure vessel having a rounded wall, said wall having a rim portion therein defining an aperture, said rim portion having an outwardly directed annular projection thereon;
    a cover plate disposed over said aperture, said cover plate having a wall the centerline of which is in alignment with the centerline of said wall of said pressure vessel and a rim portion having an annular groove therein receiving said projection to define a cylindrical zone of mutual contact therewith; and
    a plurality of bolts securing said cover plate to said pressure vessel, each said bolt intersecting a plane perpendicular to the axis of said zone and bisecting said zone.

2. The combination as set forth in claim 1 wherein each said bolt intersects said plane at a point at most one-quarter of the wall thickness of said pressure vessel wall away from the nearest centerline of said centerlines.

3. The combination as set forth in claim 1 wherein each bolt intersects said plane at a point on said centerlines.

4. The combination as set forth in claim 1 or 2 wherein said wall of said cover plate has the same curvature as said wall of said presure vessel.

5. The combination as set forth in claim 1, 2, 3 or 4 wherein said rim portions are thickened to an extent on each side of said respective wall less than eight times the square of the wall thickness of said respective wall.

References Cited
UNITED STATES PATENTS

| 3,360,154 | 12/1967 | Turner | 220—3 |
| 3,385,469 | 5/1968 | Gaines | 220—55 |

GEORGE T. HALL, Primary Examiner

U.S. Cl. X.R.

220—3